March 11, 1941.    J. N. H. TAIT ET AL    2,234,882
MOTOR VEHICLE
Filed Jan. 12, 1940    4 Sheets-Sheet 1

Inventors
John N. H. Tait
William M. Blagden
by
Attorneys

March 11, 1941.   J. N. H. TAIT ET AL   2,234,882
MOTOR VEHICLE
Filed Jan. 12, 1940   4 Sheets-Sheet 2

Inventors
John N. H. Tait
William M. Blagden
by
Attorney

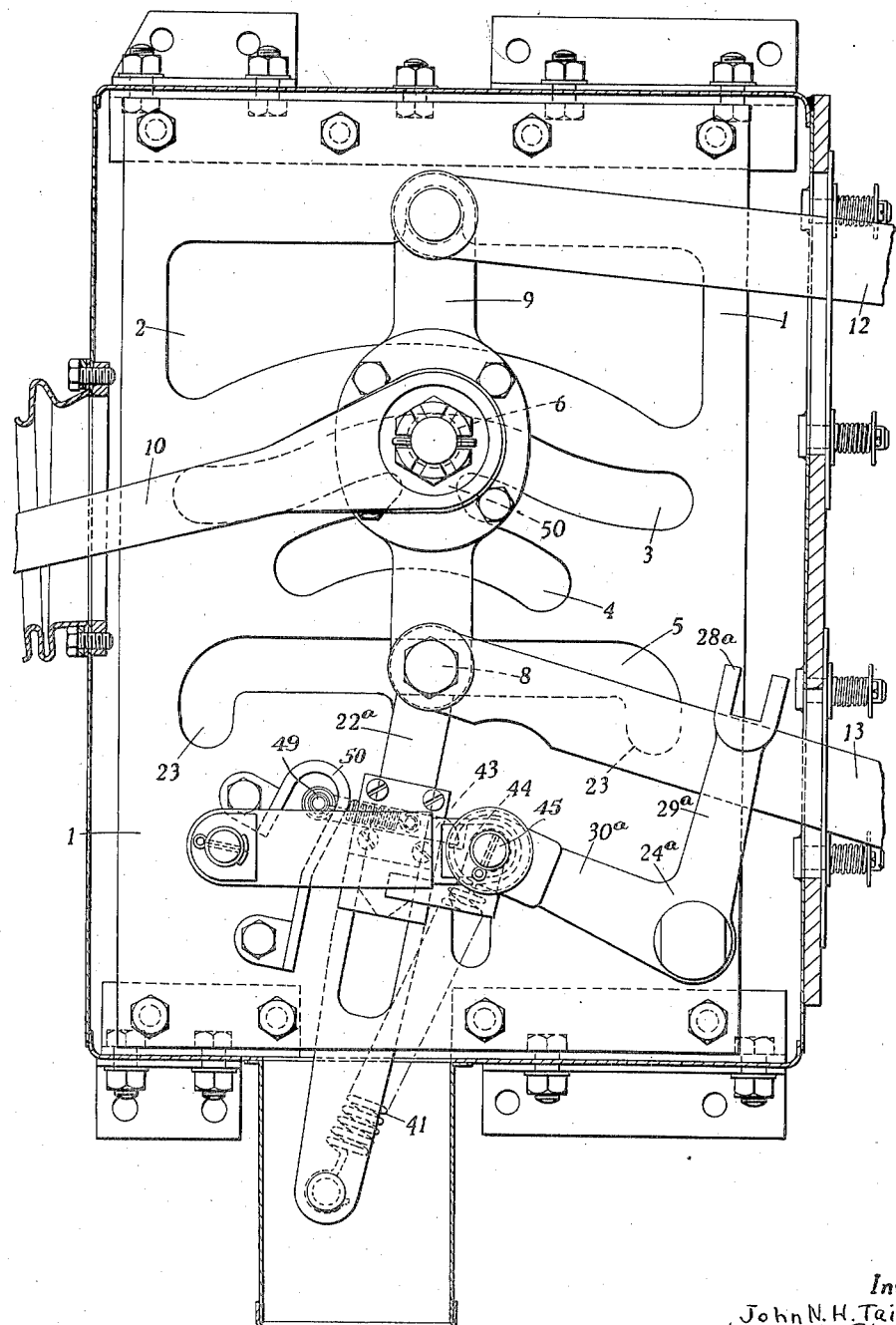

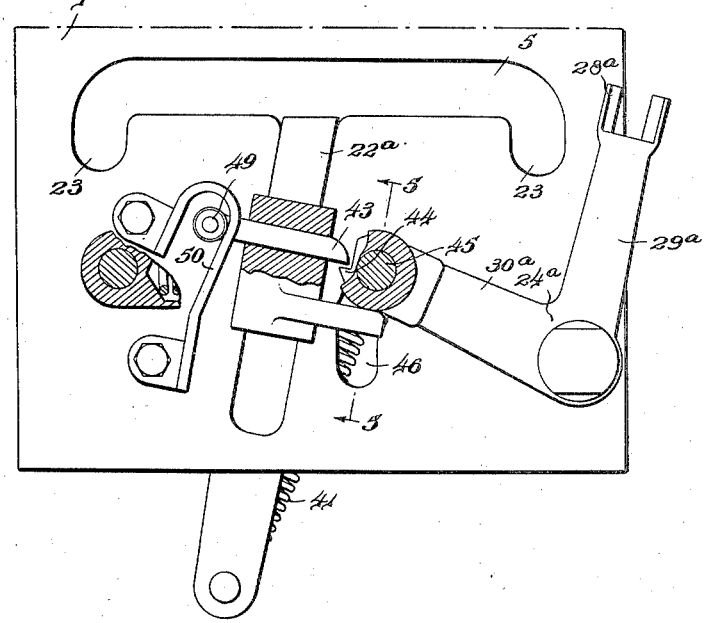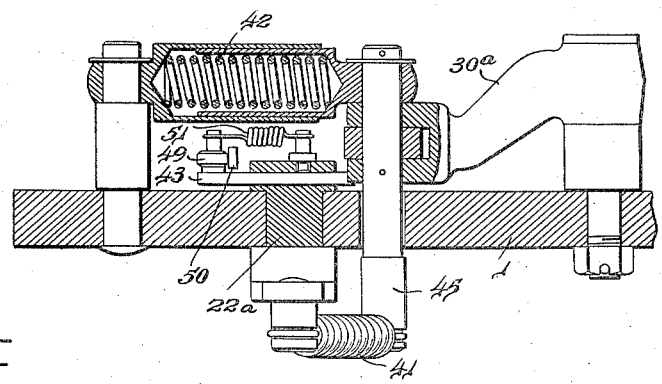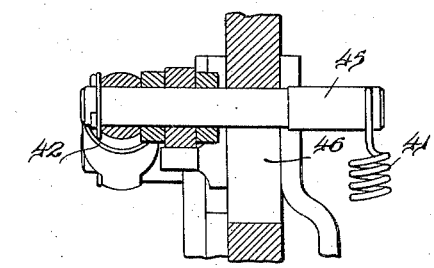

Patented Mar. 11, 1941

2,234,882

UNITED STATES PATENT OFFICE 2,234,882

MOTOR VEHICLE

John Noel Hutton Tait, Coventry, and William Martin Blagden, Farnborough, England, assignors to The Birmingham Small Arms Company Limited, Birmingham, England, a British company Application January 12, 1940, Serial No. 313,482
In Great Britain November 21, 1938

6 Claims. (Cl. 280—91)

This invention relates to motor vehicles and refers more particularly to the kind provided with means adapted to steer all the road wheels by progressive action determined by the direction in which the vehicle is geared to travel, and wherein the change of gearing from forward or reverse movement, or vice versa, is associated or coupled with the mechanism which actuates the progressive steering action, such as described in application Ser. No. 313,484, filed Jan. 12, 1940.

According to a preferred arrangement, as described in the specification of the aforesaid application cooperation between the steering mechanism and the wheels is effected by a laterally displaceable rocking lever in conjunction with a fixed guide plate, said rocking lever being connected at opposite ends respectively to the front and rear steering wheels, and a central pivot on said rocking lever is connected through an arm or rod to the steering box on the steering column. Means arranged to operate in conjunction with the reverse lever are also described in the aforesaid application, whereby a sliding block is withdrawn and the aforesaid rocking lever is moved laterally in its guide plate under the action of a spring, which lateral movement is adapted to cause the front steering wheels to be fixed or held in alignment with the vehicle, and the steering of the rear wheels to be effected by movement of the aforesaid rocking lever.

In the aforesaid application are also described means whereby, on movement of the reverse gear lever in an opposite direction to engage a forward gear, such movement is also adapted to move the aforesaid rocking lever laterally in the opposite direction to that previously described, and through a central gate or gap in the aforesaid guide plate by means of the said sliding block which is operatively connected to the reverse gear lever, in order to locate said rocking lever suitably to effect progressive steering of the front and rear steering wheels.

The aforesaid movement of the reverse gear lever to engage a forward gear can only be effected when the front wheels have assumed a straight position, because only under these circumstances is the aforesaid rocking lever in a position for its central pivot or hinge pin to pass through the central gate or gap in the fixed guide plate, and if the said rocking lever is in another position associated with the steering wheels being turned or partly turned on to one or other of their steering locks, then the rocking lever is prevented from being laterally displaced, which in turn prevents the movement of the sliding block and also the reverse gear lever to which said sliding block is operatively connected.

The object of the present invention is to provide means whereby the aforesaid reverse gear lever can be moved to engage a forward gear irrespective of whether the steering wheels are in a straight position, that is, in alignment with the vehicle or not, so that, having engaged the forward gear, the vehicle is enabled to be moved forward, thus facilitating the steering of the wheels.

The present invention consists in the provision of means operatively connected with the reverse gear lever, by which the movement of said lever into the forward gear position imposes a spring load on the sliding block which is adapted automatically to displace said rocking lever laterally at such time when the steering wheels assume, or tend to pass through, a straight position, and thereby locate said rocking lever suitably to effect progressive steering of the front and rear steering wheels.

The invention will be more completely understood from the following detailed description, which is given in conjunction with the accompanying drawings, in which—

Figure 3 is a plan view of a modification of the arrangement shown in Figures 1 and 2.

Figure 4 is a detail sectional view of the locking mechanism shown in Figure 3.

Figure 5 is a section taken on the line 5—5 in Figure 4.

Figure 6 is a view of the locking mechanism as viewed from the lower side of Figure 4.

Figure 1:
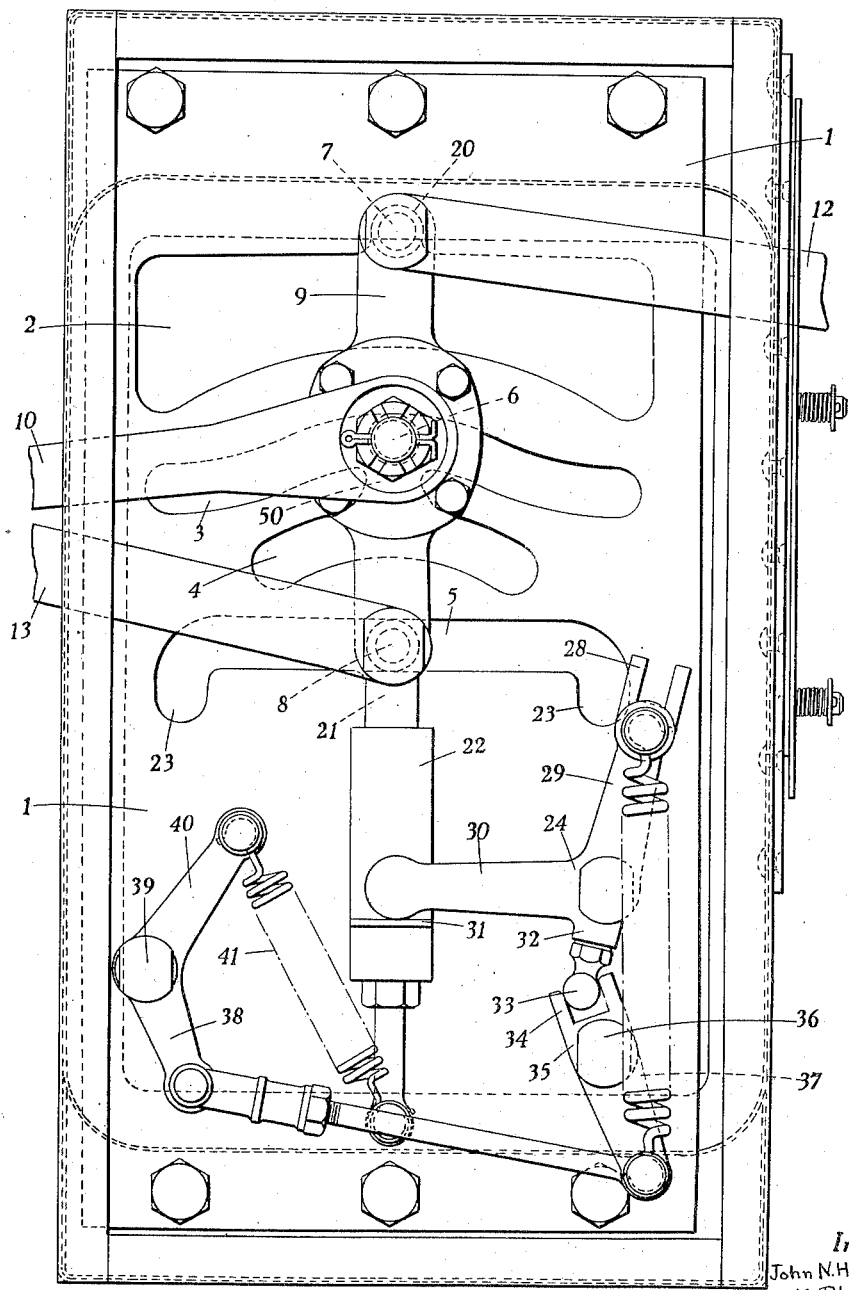
Figures 1 and 2 are plan and side views respectively of a master guide plate for controlling the steering of the front and rear wheels, together with an arrangement constructed in accordance with the invention for placing the steering mechanism under the control of the reverse lever.

Referring now to these drawings, we provide a master or guide plate 1 which is adapted to be fixed by any convenient means between the longitudinal side members of the frame of the vehicle, the said guide plate having formed therein four longitudinally disposed guide grooves 2, 3, 4, 5, the two inner grooves 3, 4, being arranged to cooperate with a central pivot pin 6, and the two outer grooves 2 and 5 being arranged to cooperate with the two outer pivot pins 7 and 8, all three pins being mounted on a rocking lever 9 which is movably mounted on said guide plate 1 and pivotally connected by the central pivot pin 6 to an arm or link 10 which connects with the operating arm of the steering box, the outer pivots 7 and 8 of said rocking lever 9 being connected by the arms 12 and 13, through a suitable linkage system with the rear and front steering wheels, the aforesaid guide grooves being so shaped and disposed (in the manner as hereinafter described) to permit of movement being imparted to the rocking lever 9 to effect the steering of the front wheels or a combined movement of the front and the back wheels when the vehicle is moving in a forward direction, and also provide for the locking of the front wheels and the steering of the rear wheels when the reverse gear is put into operation and it is desired to move the vehicle in a reaward direction.

Figure 2:
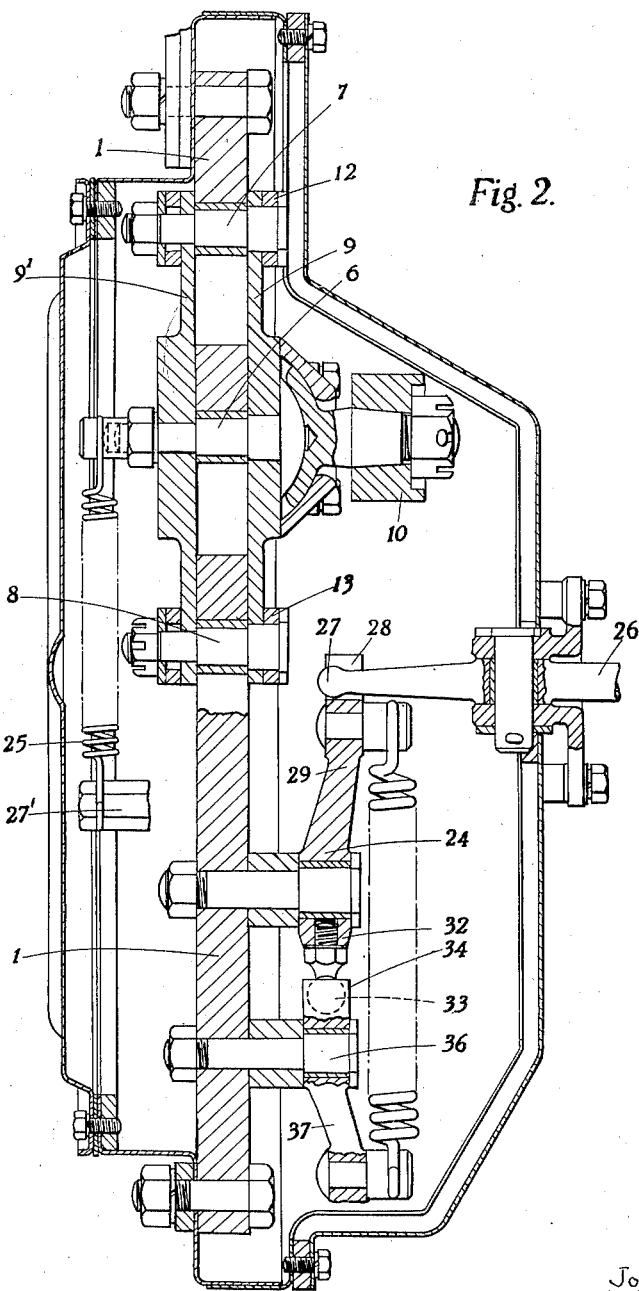

The rocking lever, as may be seen from Figure 2, comprises two bars 9, 9' mounted on each side of the guide plate 1 and connected together by the central pivot or hinge pin 6 and the two outer pivot pins 7, 8 which are arranged to engage with their respective guide grooves in the master plate 1 and, as previously described, the central pivot or hinge pin 6 of the rocking lever 9 is connected to the operating arm of the steering box on the steering column, and one end of the rocking lever is connected to the front steering wheels, while the other end of said rocking lever is connected to the rear steering wheels.

In the centre of the outer guide grooves 2 and 5 in the master plate 1, which receive the outer pivot pins 7, 8 of the rocking lever, are formed outwardly disposed recesses 20, 21 so arranged and disposed that by imparting a lateral or sideway movement to the rocking lever 9 one of the outer pivot pins thereon, e. g. 7, is brought into engagement with its central pivot recess 20, while the other outer pivot pin 8 is brought into its longitudinal guide groove 5, thus permitting of a rocking movement being imparted to the rocking lever 9 to effect the steering of the vehicle.

For the steering of the vehicle when moving in a forward direction, the rocking lever 9 is normally moved to and held in the required position by a slidable block 22 against the action of a helical spring 25 connected between the central pivot pin 6 and a fixed pin 27'. Upon movement being imparted to the rocking lever 9 about its fixed pivot 7, the central pivot or hinge pin 6 is caused to move through the curved guide groove 3 while its other outer pivot pin 8, which carries the arm 13, is moved through its longitudinal guide groove 5, and the aforesaid movement is adapted to provide for the front steering wheels being moved, say, about two-thirds of a complete lock. The outer ends of the aforesaid longitudinal guide groove 5 are curved and arranged to form a pivot recess 23 at each end, each such recess being so disposed and arranged that in the latter part of the movement of the rocking lever 9 the pivot pin 8, on its outer moving end, engages with the aforesaid curved end of its guide groove. The curved guide groove guides the central pivot pin so as to cause the said lever to move outward against its spring and to bring the said moving pivot pin 8 into the aforesaid pivot recess 23 at the end of the guide groove 5, and at the same time the pivot pin 7 of the other end of the rocking lever 9 has been withdrawn from its central pivot recess 20 in its longitudinal guide groove or clearance gap 2, which then permits the rocking lever to pivot about the pin 8 and effect a turning or steering of the rear wheels, the pin 7 being now free to move along the guide groove 2 and impart the necessary movement to the arm 12 connected to the rear wheels.

When it is desired to lock the front steering wheels in their straight position, and to effect the steering of the rear wheels only, the sliding block 22 is withdrawn from the top of the recess 21 by means of a bell crank lever 24 which is connected with the lever 26 arranged to put into operation the reverse gear, thus allowing the pivot pin 8 of the rocking lever 9 to slide down into the recess 21 under the action of the helical spring 25. Upon this sliding movement being imparted to the rocking lever, its central pivot or hinge pin 6 is moved through a central gate or gap 50 into engagement with a segmental guide groove 4 in the master plate 1 while the pivot pin 8 is moved into the recess 21 in the master plate 1, while the other pivot pin 7 is brought out of the recess 20 and into the clearance gap or guide groove 2 in said plate, thus permitting the said rocking lever 9 to pivot about the pin 8 and effect steering of the rear wheels when the vehicle is being driven in a backward direction.

The aforesaid reverse gear lever 26 is pivoted to operate fore and aft in a vertical plane and is connected, at a point between the hand knob at its top end and its pivot, to the change gear box which effects the forward and reverse gear change. At the end of said reverse gear lever, which is at the side of the pivot remote from the hand knob, is formed a ball 27 which engages with a fork 28 in one arm 29 of a bell crank lever 24 operating in a horizontal plane and pivoted on the fixed guide plate 1. Another arm 30 of said bell crank lever may engage with an abutment 31 on said sliding block 22 to withdraw it in its slot 21 when the reverse gear lever 26 is moved into its reverse position. The withdrawal of said sliding block 22 permits the lateral displacement of the rocking lever 9 which is springloaded to follow the movement of the said sliding block 22, as previously described. The aforesaid spring 25 for effecting the movement is connected at one end to the rocking lever 9 and is connected at its other end to a fixed anchorage or, if preferred, to the sliding block 22. No abutment is provided on the sliding block 22 for the aforesaid bell crank arm 30 to move it in the opposite direction when the reverse gear lever 26 is moved to the forward position, so that this reverse gear lever may be moved to the forward position without operating the sliding block 22 and the rocking lever 9.

The aforesaid bell crank lever also carries another arm 32 which is ball-ended, and this ball end 33 is arranged to engage with a fork 34 in one arm 35 of a toggle lever pivoted at 36 to operate in a horizontal plane. Another arm 37 of the aforesaid toggle lever is linked to one arm 38 of a second bell crank lever pivoted at 39 to operate in a horizontal plane, and the other arm 40 of said bell crank lever is arranged to carry one end of a tension spring 41 which is connected at its other end to the sliding block 22, and the aforesaid levers, link and spring are so arranged that when the reverse gear lever 26 is moved to the forward position the last-mentioned bell crank lever, pivoted at 39, is operated to stretch the said tension spring 41 and to apply a spring load on said sliding block 22 in the direction necessary to displace laterally said rocking lever 9, so that when the steering wheels assume the straight position the rocking lever is automatically moved back into the position in which steering of the front wheels can be effected.

In the modification shown in Figure 3 the tension spring 41 is directly connected between the sliding block 22a, and the bell crank lever 24a having the arms 29a and 30a and fork 28a thereon, thus eliminating the parts 32, 33, 34, 35, 36, 37, 38, 39 and 40 of the system of levers provided in the arrangement shown in Figures 1 and 2.

Furthermore in the modification shown in Figure 3, the gear change lever is maintained in position by means of a compression spring 42 acting on the end of the lever 30a, and in order to prevent the sliding block being pushed back so as to join the steering a spring-loaded pawl 43 is mounted on the sliding block 22a which engages with an abutment 44 in the end of the lever 30a, this pawl being withdrawn by a cam shaped strip when the sliding block 22a is moved back for reverse steering.

In the arrangement shown in Figure 3, the arm 30a of the bell crank lever carries a pin 45 which extends to the underside of the master plate 1 through the slot 46, and the spring 41 is connected between the pin 45 and the end of the sliding block 22a. The forces exerted by the rocking lever 9 tend to push the sliding block 22a down in its slot, but this is avoided by the spring-loaded pawl 43 incorporated in the sliding block 22a, this pawl engaging with a notch or abutment 44 in one jaw of the arm 30a, which prevents the sliding block 22a from moving back, because it cannot then move without moving the bell crank lever, which is restrained by the spring 42 and also by the forward and reverse lever which in turn is locked. When however the sliding block 22a is moved down in its slot by movement of the reverse lever which indirectly moves the arm 30a, the spring-loaded pawl 43 is withdrawn from the notch or abutment 44 against the action of the spring 51 by virtue of the roller 49 rolling down a cam-shaped strip 50, the said strip providing a surface which is inclined to the axis of the sliding block 22a, and thereby causing the withdrawal of the pawl 43. When the sliding block 22a is withdrawn down its slot to a position remote from that shown, i. e. with reverse steering, it is necessary to be able to change into a forward gear, whether the rocking lever 9 is suitably positioned to change over into forward steering or not. The retraction of the spring-loaded pawl 43 permits the gear lever to be moved and the arm 30a to swing into the position shown, thus exerting the spring load on the sliding block 22a by means of the spring 41. When the rocking lever 9 passes through the straight ahead position this spring load causes it to move over into forward steering. The shape of the end of the spring-loaded pawl 43 is such that it can latch itself into the notch or abutment 44 thus locking the sliding block 22a in the position shown.

Having thus described our invention, what we claim as new and desire to secure by Letters Patent is:

1. Steering mechanism for motor vehicles comprising a rocking lever having members connected thereto for steering the front and rear wheels, means including a fixed guide plate cooperating with said rocking lever to effect progressive steering movements of the steering members for the front and rear wheels and embodying means operative by displacement of said rocking lever to lock the steering member for the front wheels and place the steering member for the rear wheels under the control of said rocking lever, and means operable to apply a spring load to said rocking lever to displace the latter automatically into a position to effect progressive steering movements of the steering members for the front and rear wheels when said members assume or tend to pass through a straight steering position.

2. Steering mechanism for motor vehicles comprising a laterally displaceable rocking lever having members connected thereto for steering the front and rear wheels, means including a fixed guide plate cooperative with said rocking lever to effect progressive steering movements of the steering members for the front and rear wheels, a sliding block cooperative with said guide plate and movable into a position to cause displacement of said rocking lever laterally and thereby hold the steering member for the front wheels in straight steering position and place the steering movements of the steering member for the rear wheels under control of said rocking lever, and means for imposing a spring load on said sliding block to automatically restore said rocking lever laterally to its normal position when the steering member for the front wheels assumes, or tends to pass through, a straight steering position and thereby locate said rocking lever to effect progressive steering movements of the steering members for the front and rear wheels.

3. Steering mechanism according to claim 2, wherein said means for imposing a spring load on said sliding block comprises a bell crank lever having one arm operatively associated with said sliding block, and means operatively associated with another arm of said bell crank lever for imposing the spring load on said sliding block in a direction substantially opposite to its direction of movement by said bell crank lever.

4. Steering mechanism according to claim 2, wherein said means for imposing a spring load on said sliding block comprises a bell crank lever having an arm operatively associated with a projection on said block to move the latter in one direction by movement of said bell crank lever in one direction but leave said bell crank lever free to move in the opposite direction without effecting movement of said block.

5. Steering mechanism according to claim 2, wherein said means for imposing a spring load on said sliding block comprises a bell crank lever, and a spring connected to said bell crank lever and to the end of said sliding block remote from said rocking lever, said bell crank lever being operative to move said sliding block into position for lateral displacement of said rocking lever and to load said spring and thereby apply a force to said sliding block tending to restore said block and rocking lever to normal position.

6. Steering mechanism according to claim 2, wherein said means for imposing a spring load on said sliding block comprises a bell crank lever having an arm operative to move said sliding block into a position for lateral displacement of said rocking lever, a spring connected at one end to the end of said sliding block remote from said rocking lever, and a system of levers connecting another arm of said bell crank lever to the other end of said spring and operative by the movement of said bell crank lever to move said sliding block into position for lateral displacement of said rocking lever to load said spring and thereby apply a force to said sliding block tending to restore said block and said rocking lever to normal position.

JOHN NOEL HUTTON TAIT.
WILLIAM MARTIN BLAGDEN.